United States Patent
Mikoshiba et al.

[11] Patent Number: 6,160,960
[45] Date of Patent: Dec. 12, 2000

[54] IMAGE PICK-UP APPARATUS

[75] Inventors: Hironobu Mikoshiba; Haruki Nakayama; Hiroyuki Horiuchi, all of Hachioji, Japan

[73] Assignee: Konica Corporation, Japan

[21] Appl. No.: 09/151,182

[22] Filed: Sep. 10, 1998

[30] Foreign Application Priority Data

Sep. 18, 1997 [JP] Japan .................................. 9-253273

[51] Int. Cl.[7] ............................. G03B 7/16; G03B 15/03; G03B 17/48; H04N 7/18
[52] U.S. Cl. ............................ 396/61; 396/67; 396/161; 396/166; 396/429; 348/64; 348/363; 348/371
[58] Field of Search .................................. 396/65–70, 61, 396/170, 166, 159, 161, 168, 167, 429; 348/64, 363, 370, 371

[56] References Cited

U.S. PATENT DOCUMENTS

| | | | |
|---|---|---|---|
| 3,836,922 | 9/1974 | Hasegawa et al. | 396/67 |
| 4,366,501 | 12/1982 | Tsunekawa et al. | 396/161 X |
| 4,742,369 | 5/1988 | Ishii et al. | 348/64 X |
| 4,953,029 | 8/1990 | Morimoto et al. | 348/64 |
| 5,343,268 | 8/1994 | Takahashi et al. | 396/159 |
| 5,602,614 | 2/1997 | Ohtsuka et al. | 396/61 |
| 5,867,741 | 2/1999 | Maruyama et al. | 348/64 X |
| 5,978,016 | 11/1999 | Lourette et al. | 348/64 |

*Primary Examiner*—W. B. Perkey
*Attorney, Agent, or Firm*—Jordan B. Bierman; Bierman, Muserlian and Lucas

[57] ABSTRACT

An image pick-up apparatus includes: an image pick-up device for picking up an object image by converting the object image to an electric image signal; an image pick-up optical system having a variable aperture capable of changing an aperture value when an incident light beam on the image pick-up device is stopped down; a range-finder for measuring a distance to an object; an electronic flash mechanism for illuminating the object; and controller for determining an aperture value from the distance to the object measured by the range-finder and from a light emission capability of the electronic flash mechanism, and then for setting the variable aperture to the determined aperture value, when the controller makes the electronic flash mechanism to emit light so that the image pick-up device picks up the object image.

13 Claims, 8 Drawing Sheets

IMAGE PICK-UP APPARATUS

BACKGROUND OF THE INVENTION

The present invention relates to an image pick-up apparatus, and more particularly, to a camera which picks up images with a solid image pick-up element and a silver halide camera equipped with an electronic viewfinder.

An ordinary camera (hereinafter referred to as a silver halide camera) which employs a silver halide film for photographing is equipped with an optical viewfinder which is structured so that an object to be photographed can be confirmed.

The silver halide camera of this kind has had a problem that what has been photographed actually can not be confirmed immediately after photographing, which is different from a video camera and a digital camera.

(1) For the confirmation of this kind, it is considered to provide on a silver halide camera an electronic viewfinder composed of a solid image pick-up element (such as CCD and others) and a liquid crystal display device (LCD). However, some problems stated below are feared for the reason that a dynamic range of a solid image pick-up element such as CCD is narrow, compared with a latitude of a silver halide film.

-1- There happens an occasion where a range which represents an optimum exposure for a silver halide film does not represent an optimum exposure on the part of the electronic viewfinder. Namely, a small difference in an amount of light received by a solid image pick-up element is displayed on an LCD as a big difference in light intensity.

-2- For the same reason, there sometimes happens a phenomenon (a false night view) wherein a background is extremely dark on the part of an electronic viewfinder due to a difference of luminance between a primary subject and a background especially when an electronic flash is used for photographing.

-3- On the electronic viewfinder, an electronic shutter employing CCD controls exposure without being equipped with an iris aperture. It is therefore impossible to confirm a depth of field in a silver halide camera. In this case, even when an iris aperture is simply provided, a false night view tends to be caused for the same reason as that in -2- above, which is a problem.

-4- Even when an automatic electronic flash is used, it is difficult to adjust a quantity of light for both a silver halide film and a CCD at the same time. In particular, this phenomenon is remarkable when there is a big difference of sensitivity between a film and a CCD. Incidentally, when the film sensitivity differs greatly from the CCE) sensitivity, it is possible to cope with this problem by shifting an aperture on the part of the CCD from that on the part of the film. In this case, however, an aperture on the part of the CCD requires aperture mechanism which is extremely accurate.

(2) On the other hand, in view of a disadvantage caused when an automatic electronic flash is used, it is also considered to use an electronic flash of a flashmatic control type. The flashmatic control implies the control wherein an electronic flash is caused to emit light at its full power without controlling an amount of light emitted from the electronic flash, and an aperture value is determined so that the product of the distance to the subject and the aperture value is equal to the guide number of the electronic flash.

However, even under this flashmatic control, another trouble stated below is feared.

-5- Under this flashmatic control, it is necessary to control an aperture value accurately. However, on the CCD wherein a light-receiving area is smaller than that of a film, accuracy is required to be improved for the smaller light-receiving area. Accordingly, there is caused a problem that an aperture device on the part of the CCD is expensive in cost and large in size.

As stated in "-1-" to "-5-" above, it has been difficult for both cases of an automatic electronic flash and a flashmatic control electronic flash to make exposure for photographing on a silver halide film and exposure for image pick-up on a CCD to be compatible with each other.

As stated above, a CCD has a problem that accuracy of an aperture for the CCD needs to be improved, and the following problem is further caused to be related to the aforesaid problem.

-6- Though operations of an aperture are checked and adjusted in the course of its manufacture, there is caused a difference between an appropriate aperture value and an actual aperture value for light emission to make exposure to tends to be unstable, because various changes such as a change with time, a change with temperature and a change with humidity which can not be expected in manufacture are caused on the aperture afterwards. In particular, this phenomenon is more conspicuous on a CCD having the smaller light-receiving area than that on a silver halide film than on the silver halide film. To eliminate the changes mentioned above, the aperture mechanism which is of higher accuracy is needed, and higher cost and larger size of the aperture are caused. On the other hand, in a digital still camera equipped with an electronic flash, an automatic electronic flash control is employed to make an amount of exposure in photographing with an electronic flash to be an appropriate value. However, there has been a problem in the automatic electronic flash control that mechanism is complicated and a product is large in size and high in cost.

SUMMARY OF THE INVENTION

The present invention has been achieved in view of the technical problems stated above, and its first object is to realize a camera wherein image pick-up is made by a solid image pick-up element capable of giving appropriate exposure to the image pick-up element in electronic flash photographing.

The second object is to realize a silver halide camera which is equipped with an electronic viewfinder capable of giving appropriate exposure to both of a silver halide film and a solid image pick-up element in the course of light emission of an electronic flash. The third object is to provide a digital still camera equipped with an electronic flash which can be made inexpensive in cost and small in size and can stabilize exposure and obtain appropriate exposure in the course of electronic flash photographing.

With a background stated above, there have been found novel technologies which can give appropriate exposure also to a solid image pick-up element having many problems mentioned above, under the state wherein a silver halide film is given appropriate exposure.

Namely, the invention solving the aforesaid problems includes the following.

(A) The invention of a camera (image pick-up device) which conducts image pick-up by means of a solid image pick-up element:

(1) An image pick-up device having therein an image pick-up means which converts an image of a subject into electric image signals for conducting image pick-up, an image pick-up optical system equipped with a variable aperture capable of changing an aperture value when stopping down an incident light flux to the image pick-up means, a range-finding means to measure a distance to a subject, a flashing mechanism to illuminate a subject, and a control means which determines, from the distance to the subject measured by the range-finding means and from light emission capability of the flashing mechanism, the aperture value which makes the signal level in the electric image signals of the image pick-up means to be appropriate, then sets the variable aperture to the aperture value, and causes the flashing mechanism to emit light so that the image pick-up means may conduct image pickup.

(2) The image pick-up device according to (1) above, wherein the control means makes the flashing mechanism to emit light when the aperture value of the variable aperture becomes an appropriate value during the period for the aperture value to change.

(3) The image pick-up device according to (1) above, wherein the control means makes the flashing mechanism to emit light by fixing the aperture value of the variable aperture to the determined value.

(4) The image pick-up device according to (1) above, wherein the control means changes an aperture of the variable aperture to further open or close after light emission of the flashing mechanism, to conduct exposure for the prescribed period of time.

(5) The image pick-up device according to (1) above, wherein there is provided a storage means which stores the relation between the operation time for the variable aperture to operate from the prescribed aperture value and an amount of change in the aperture value, and the control means refers to the relation between the operation time stored in the storage means and an amount of change of the aperture value, and causes the flashing mechanism to emit light by driving the variable aperture so that the aforesaid determined value may be obtained.

In the case of the image pick-up devices (cameras to conduct image pick-up with a solid image pick-up element) according to (1)–(5) above, it is possible to photograph with appropriate exposure when photographing through light emission made by flashing mechanism. (B) The invention of a silver halide camera (image pickup device) which is equipped with an electronic viewfinder:

(6) An image pick-up device having therein a first image pick-up optical system equipped with a first variable aperture capable of changing an aperture value when stopping down an incident light flux to the image pick-up means which converts an image of a subject into electric image signals for conducting image pick-up, a second image pick-up optical system equipped with a second variable aperture capable of changing an aperture value when stopping down an incident light flux, and conducts image pick-up on a silver halide film, a range-finding means to measure a distance to a subject, a flashing mechanism to illuminate a subject, and a control means which causes the flashing mechanism to emit light and causes the first image pick-up optical system and the second image pick-up optical system to conduct image pick-up simultaneously.

(7) The image pick-up device according to (6) above, wherein the control means determines an aperture value of the first variable aperture making the signal level at the image pick-up means to be appropriate and determines an aperture value of the second variable aperture making the exposure on the silver halide film to be appropriate from the distance to a subject measured by the range-finding means and from light emission capability of the flashing mechanism, then sets the first and second variable apertures to the aperture values and causes the flashing mechanism to emit light so that the first image pick-up optical system and the second image pick-up optical system may conduct image pick-up.

(8) The image pick-up device according to (7) above, wherein the control means causes the flashing mechanism to emit light when the aperture value of the fist variable aperture becomes the determined aperture value while it is changing.

(9) The image pick-up device according to (8) above, wherein there is provided a storage means which stores the relation between the operation time for the first variable aperture to operate from the prescribed aperture value and an amount of change in the aperture value, and the control means refers to the relation between the operation time stored in the storage means and an amount of change of the aperture value, and causes the flashing mechanism to emit light by driving the first variable aperture so that the aforesaid determined value may be obtained.

(10) The image pick-up device according to (8) above, wherein the control means causes the flashing mechanism to emit light when the aperture value of the second variable aperture becomes the determined aperture value while it is changing.

(11) The image pick-up device according to (10) above, wherein the control means causes the first variable aperture and the second variable aperture to arrive at the determined aperture value, and causes the flashing mechanism to emit light when both aperture values arrive at the determined value.

(12) The image pick-up device according to (8) above, wherein the control means fixes the second variable aperture at the determined aperture value, and causes the flashing mechanism to emit light.

(13) The image pick-up device according to (12) above, wherein the control means fixes the second variable aperture at the determined aperture value, then causes the flashing mechanism to emit light, and changes the aperture value of the second variable aperture after light emission of the flashing mechanism for the image pick-up for the prescribed period of time.

(14) The image pick-up device according to (7) above, wherein the control means fixes the first variable aperture at the determined aperture value, and causes the flashing mechanism to emit light.

(15) The image pick-up device according to (14) above, wherein the control means causes the flashing mechanism to emit light while the aperture value of the second variable aperture is changing and when it becomes the determined aperture value.

(16) The image pick-up device according to (14) or (15) above, wherein the control means causes the flashing mechanism to emit light by fixing the first variable aperture at the determined aperture value, and changes the aperture value of the first variable aperture after light emission of the flashing mechanism so that image pick-up for the prescribed period of time may be conducted.

(17) The image pick-up device according to (14) above, wherein the control means fixes the first variable aperture at the determined aperture value, and fixes the second variable aperture at the determined aperture value, and causes the flashing mechanism to emit light.

(18) The image pick-up device according to (7) or (17) above, wherein the control means fixes the first variable aperture at the determined aperture value, and causes the flashing mechanism to emit light, and changes the aperture value of the first variable aperture after light emission of the flashing mechanism so that image pick-up for the prescribed period of time may be conducted.

(19) The image pick-up device according to (6) above, wherein there are provided a detecting means to detect luminance of a subject and a light emission control means which stops light emission of the flashing mechanism when the detecting means detects luminance of a subject from the starting time for light emission of the flashing mechanism and detects that the luminance arrives at the prescribed quantity of light, and image pick-up is conducted with single light emission of the flashing mechanism.

(20) The image pick-up device according to (19) above, wherein in the first prescribed quantity of light which provides appropriate exposure under the sensitivity of the image pick-up means and the aperture value of the first variable aperture in single light emission of the flashing mechanism and the second prescribed quantity of light which provides appropriate exposure under the sensitivity of the silver halide film and the aperture value of the second variable aperture, the control means causes the first prescribed quantity of light and the second prescribed quantity of light to agree with each other.

(21) The image pick-up device according to (19) or (20) above, wherein the control means causes the flashing mechanism to emit light when the first and second variable apertures arrive at the determined aperture value, and changes the aperture values of the first and second variable apertures after light emission of the flashing mechanism so that image pick-up for the prescribed period of time may be conducted.

In the case of the image pick-up devices (silver halide cameras each being equipped with an electronic viewfinder) according to (6)–(21) above, it is possible to photograph with appropriate exposure for both a silver halide film and a solid image pick-up element when conducting electronic flash photographing using the flashing mechanism.

BRIEF DESCRIPTION OF THE DRAWINGS

Each of FIGS. 4(a) and 4(b) is an illustration showing an example of operations of a variable aperture in a silver halide camera equipped with an electronic viewfinder in an embodiment of the invention.

Each of FIGS. 6(a), 6(b) and 6(c) is a time chart showing the state of operations of a CCD aperture in a silver halide camera equipped with an electronic viewfinder in an embodiment of the invention.

Each of FIGS. 8(a) and 8(b) is an illustration showing how a CCD aperture is controlled in emission of an electronic flash in a silver halide camera equipped with an electronic viewfinder in an embodiment of the invention.

DETAILED DESCRIPTION OF THE PREFERRED EMBODIMENT

A camera wherein a solid image pick-up element conducts image pick-up and a silver halide camera equipped with an electronic viewfinder, representing an embodiment of an image pick-up device of the invention will be explained in detail as follows.

Incidentally, since a camera wherein a solid image pickup element conducts image pick-up is a part of a silver halide camera equipped with an electronic viewfinder, an explanation of the present embodiment will be made, focusing on the silver it halide camera equipped with an electronic viewfinder.

First, the general structure of the silver halide camera equipped with an electronic viewfinder used in an embodiment of the invention will be explained with reference to FIG. 1 which is a function block diagram showing schematically the general and electrical structure of a silver halide camera equipped with an electronic viewfinder in an embodiment of the invention.

Structure of a silver halide camera equipped with an electronic viewfinder

Figure 1:
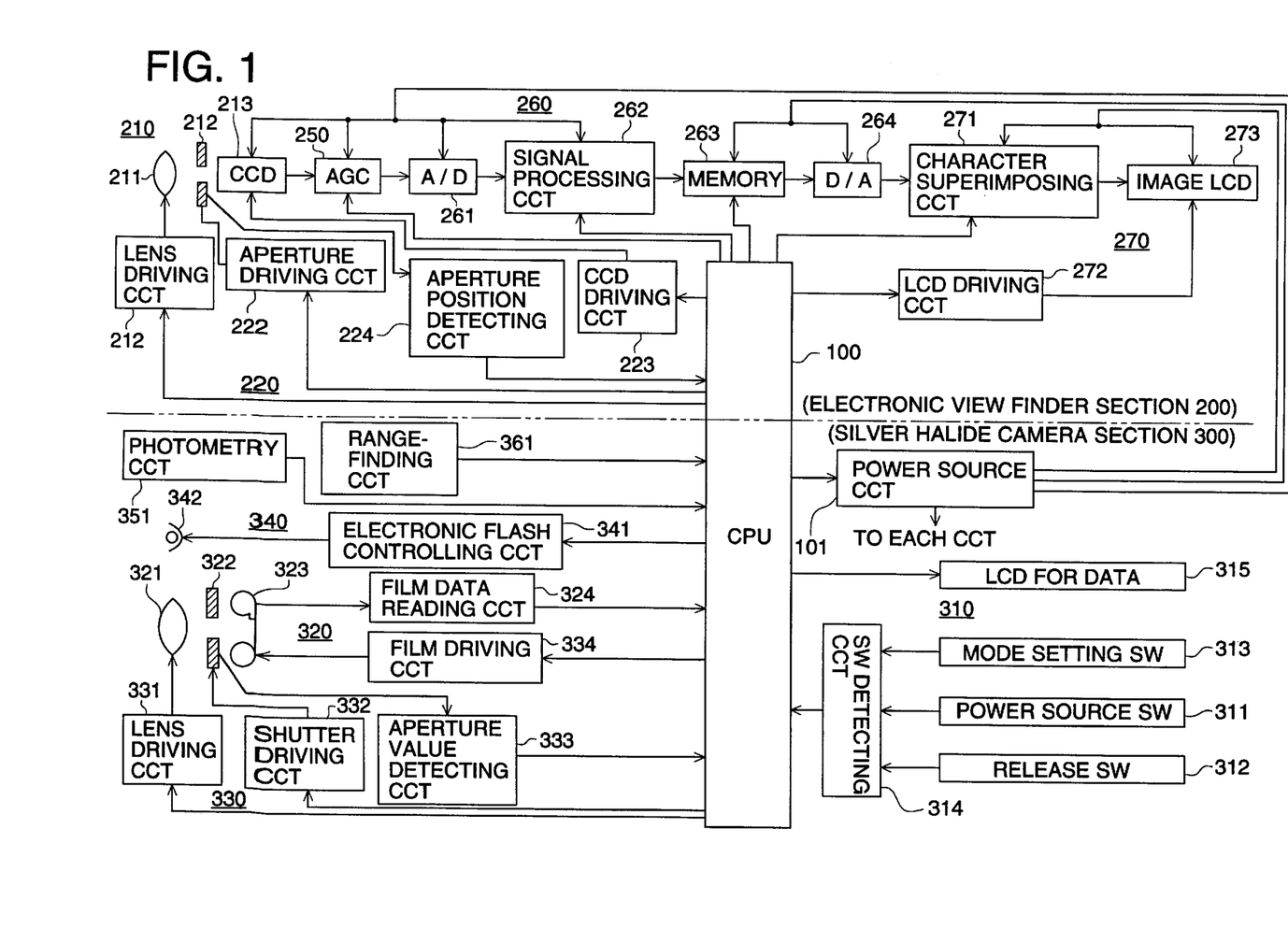
FIG. 1 is a function block diagram showing the structure of a silver halide camera equipped with an electronic viewfinder used in an embodiment of the invention.

The silver halide camera equipped with an electronic viewfinder in the present embodiment shown in FIG. 1 can be divided roughly into CPU 100 which controls various parts, electronic viewfinder section 200 which conducts image pick-up with a CCD and displays an image on an LCD for an image, and silver halide camera section 300 which conducts photographing on a silver halide film. Incidentally, CPU 100 and electronic viewfinder section 200 can structure a camera which conducts image pick-up with a solid image pick-up element.

Incidentally, in the explanation of the present embodiment, the expression of photographing is for a silver halide film and the expression of image pick—up is for a CCD, both of which, however, are included in the image pick-up.

CPU 100, in this case, constitutes a control means which controls various parts, and conducts various controls which in will be described later. It also constitutes a calculating means which conducts prescribed calculation.

Power supply circuit 101 boosts and generates +5V, +3.3V, +15V and −9V which are needed for various parts in the whole silver halide camera equipped with an electronic viewfinder shown in FIG. 1, based on commands from CPU 100.

The electronic viewfinder section 200 is composed of image pick-up optical system (first image pick-up optical system) 210 having therein lens 211, CCD aperture (first variable aperture) 212 and CCD 213 serving as an image pick-up element, image pick-up processing circuit system 220 having therein lens driving circuit 221, aperture driving circuit 222, aperture position detecting circuit 224 and CCD driving circuit 223, AGC circuit 250 which amplifies analog image signals obtained from CCD 213 at the prescribed amplification rate, digital image data circuit system 260 having therein A/D conversion circuit 261, signal processing circuit 262 which conducts image processing on digital image signals, memory 263 for image accumulation and D/A conversion circuit 264 and display system 270 having therein character insertion circuit 271, LCD driving circuit and LCD 273 for an image.

In the electronic viewfinder section 200 stated above, optical images obtained through the optical system 210 such as the lens 211 and the CCD aperture 212 are formed on a light-receiving surface of the CCD 213 as images.

In this case, the lens 211 and the aperture 212 are driven respectively by the lens driving circuit 221 and the aperture driving circuit 222. An aperture position of the aperture 212 is detected by the aperture position detecting circuit 224.

The lens driving circuit 221 is composed, for example, of a stepping motor, and it changes a lens position through control of CPU 100 and thereby properly focuses an optical focal plane of a subject on the CCD 213. The aperture driving circuit 222 changes an aperture value optically through control of CPU 100.

Analog image signals outputted from the CCD 213 are adjusted in terms of gain by the AGC circuit 250, and are subjected to knee processing for expansion of a dynamic range, if necessary.

After the analog image signals are converted into digital image signals by the A/D conversion circuit 261, they are subjected to luminance processing, color processing and electronic zoom by the signal processing circuit 262 to be converted into digital video signals (for example, luminance signals (Y) and color difference signals (Cr, Cb)), and are stored in the memory 263.

The digital video signals stored in the memory 263 are returned by the D/A conversion circuit 264 to analog video signals in which prescribed character information is superimposed by the character insertion circuit 271, and the analog video signals are displayed on the LCD 273 for an image. In this case, images obtained by CCD 213 usually are updated for each field or each frame to be displayed on a real time basis, and when photographing by silver halide camera section 300 described later is conducted, images in film photographing are displayed as still images. Control of this kind is conducted based on commands of CPU 100.

The silver halide camera section 300 is composed of operation display system 310 having therein power supply switch 311, release switch 312, mode setting switch 313, switch detecting circuit 314 and LCD for date 315 which displays date, image pick-up optical system (second image pick-up optical system) 320 having therein lens 321, aperture-for-film/shutter (second variable aperture) 322, film 323 such as J 135 and IX-240 and film data reading circuit 334, photographing system 330 having therein lens Driving circuit 331, shutter driving circuit 332, aperture value detecting circuit 333 and film driving circuit 334, electronic flash system 340 having therein electronic flash control circuit 341 and Xe lamp 342, photometric circuit 351 and range-finding circuit 361.

Incidentally, the electronic flash system 340 in the present embodiment constitutes flashing mechanism. Therefore, light emission of an electronic flash implies light emission of the flashing mechanism.

In the silver halide camera 300 stated above, optical images obtained through the optical system 320 such as the lens 321 and the aperture-for-film/shutter 322 are formed on a light-receiving surface of the film 323.

In this case, the lens 321 and the aperture-for-film/shutter 322 are driven respectively by the lens driving circuit 331 and the shutter driving circuit 332. An aperture value of the aperture-for-film/shutter 322 is detected by the aperture value detecting circuit 333.

The lens driving circuit 331 is composed, for example, of a stepping motor, and it changes a lens position through control of CPU 100 and thereby properly focuses an optical focal plane of a subject on the film 323. The shutter driving circuit 332 changes an aperture value optically through control of CPU 100, and drives to open or close the shutter. Due to operations of the operation display system 310, the CPU 100 causes the film driving circuit 334 to conduct film feeding. In this case, the photometric values and range-finding values obtained respectively by the photometric circuit 351 and the range-finding circuit 36h are used for reference.

When the photometric value obtained by the photometric circuit 351 is less than the prescribed value, the range-finding value obtained by the range-finding circuit is also used for reference to give a command of electronic flash light emission to the electronic flash control circuit 341.

Operations of a silver halide camera equipped with an electronic viewfinder

Flashmatic control:

Now, a series of operations of a silver halide camera equipped with an electronic viewfinder concerning photographing accompanied by electronic flash light emission (electronic flash photographing) will be explained with reference with a flow chart in FIG. 2.

Figure 2:
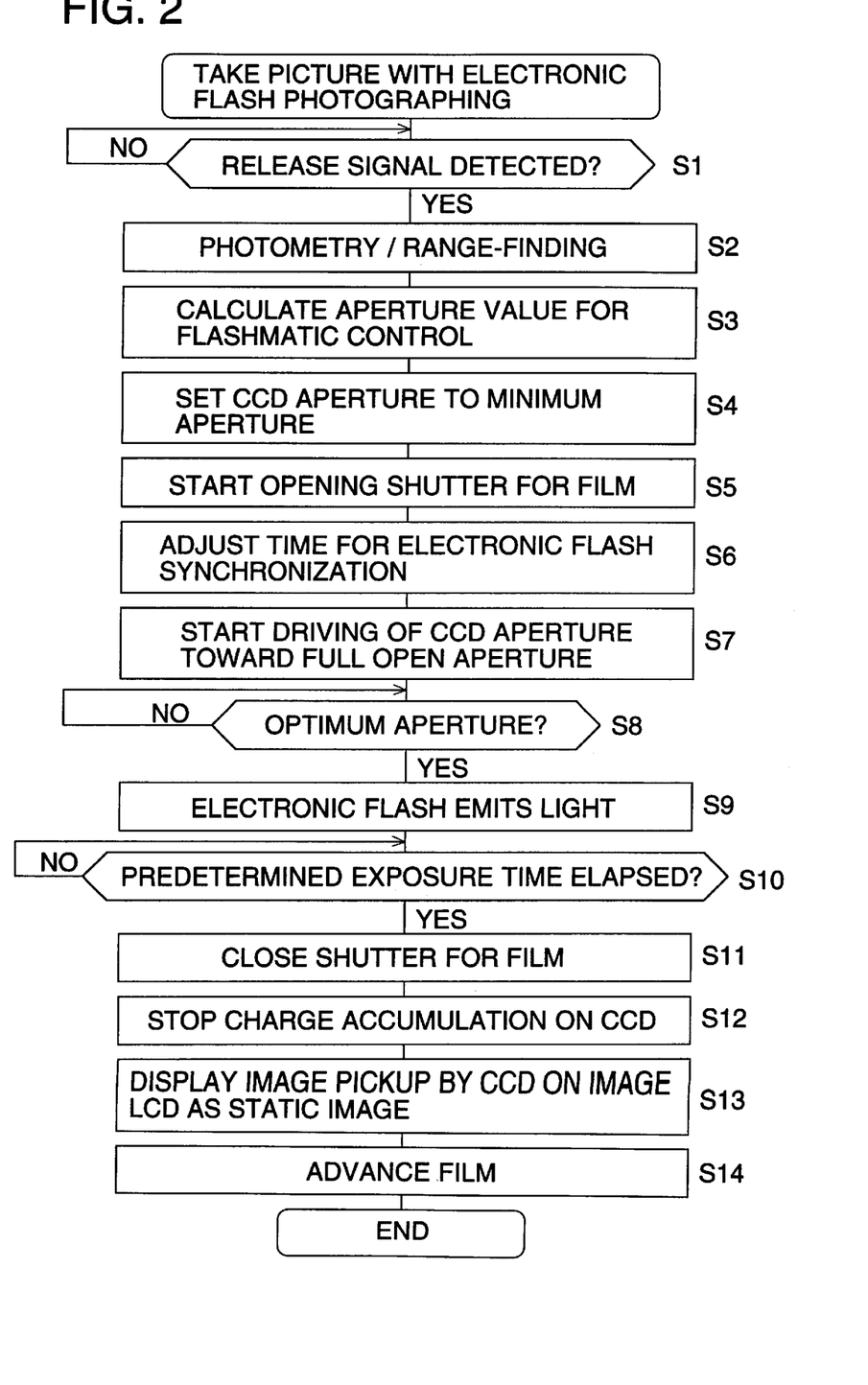
FIG. 2 is a flow chart showing operations of a silver halide camera equipped with an electronic viewfinder in an embodiment of the invention.

Incidentally, a flow chart in FIG. 2 shown here is a routine concerning electronic flash photographing called from the main photographing processing routine. Namely, it is processing required when CPU 100 judges, from the photometric value obtained from the photometric circuit 351, that a subject needs to be illuminated by an electronic flash.

In this case, CPU 100 waits the release switch 312 to be pressed down, and once the release switch 312 is depressed down, the CPU 100 gives a command for photometry and a command for range-finding respectively to the photometric circuit 351 and the range-finding circuit 361 (S2).

Referring to the photometric value and the range-finding value obtained, the CPU 100 obtains the aperture value of flashmatic control in electronic flash photographing through calculation (S3). Incidentally, the flashmatic control implies the control wherein an electronic flash is caused to emit light always constantly, preferably at its full power without controlling an amount of light emitted from the electronic flash, and an aperture value is determined so that the product of the distance to the subject and the aperture value is equal to the guide number of the electronic flash.

Here, the aperture driving circuit 222 sets CCD aperture 212 to its smallest aperture (S4), and the stutter driving circuit 332 gives a command for opening to the aperture-for-film/shutter 322 (S5). Following this command for opening, the aperture-for-film/shutter 322 conducts exposure for the prescribed exposure time (shutter speed) at its aperture value determined by calculation under flashmatic control.

Then, time adjustment is made to adjust time lag between an aperture value of the aperture-for-film/shutter and that of the CCD aperture 212 (S6). This time adjustment is made because both apertures mentioned above are different in terms of the state in timing of electronic flash light emission as described later.

After this time adjustment, the CCD aperture 212 starts to be driven toward full open, and operations to sweep away electric charges of the electronic shutter by CCD driving circuit 223 are stopped so that accumulation of electric charges (exposure) may be started (S7).

Here, CPU 100 gives a command for light emission (XTRG) to the electronic flash control circuit 341 to cause Xe lamp 342 to emit light, at the timing to realize the appropriate aperture value determined by calculation under the aforesaid flashmatic control, during the period when an aperture of the CCD aperture 212 is changing (S8, S9).

After progress of the prescribed exposure time (shutter speed) from the light emission of the electronic flash (SIO), CPU 100 gives commands to various sections so that the aperture-for-film/shutter 322 may be closed to end the exposure on a film (S11), and accumulation of electric charges of CCD 213 may be stopped simultaneously (S12).

When photographing on a film and image pick-up on CCD are completed after the foregoing, CPU 100 gives commands to various sections of electronic viewfinder section 200 so that image data resulting from image pick-up may be stored in memory 263 and then is kept being displayed on LCD 273 for an image through freezing (S13).

In parallel with the foregoing, the CPU 100 gives a command of film feeding (S14) to film driving circuit 334 to be ready for the succeeding photographing on a film.

Incidentally, when displaying still images, the CPU 100 gives, if necessary, a command for image display by superimposing data concerning the photographing on the images as character information with character insertion circuit 271. This image display as still images is kept until the moment when the preparation for the succeeding photographing on a film is started. With regard to the CCD aperture 212, it can be closed in case of need.

In the silver halide camera equipped with the electronic viewfinder stated above, it is possible, through single light emission of an electronic flash, to give appropriate exposure to both of a silver halide film and a solid image pick-up element in stable exposure.

Further, in both of photographing on a silver halide film and image pick-up in an electronic viewfinder section, it is possible to obtain satisfactory exposure by, using an electronic flash of a flashmatic control type.

Further, since an electronic flash emit; light while an aperture value of CCD aperture 212 is being changed, an exposure period wherein an aperture is greater than that in the case of light emission of an electronic flash exists during the period other than the period of light emission of an electronic flash. Therefore, it is possible to give extra exposure to a background existing beyond a primary subject and thereby to reduce a difference of an amount of exposure between the background and the subject which receives appropriate exposure from light emission of an electronic flash.

Figure 3:
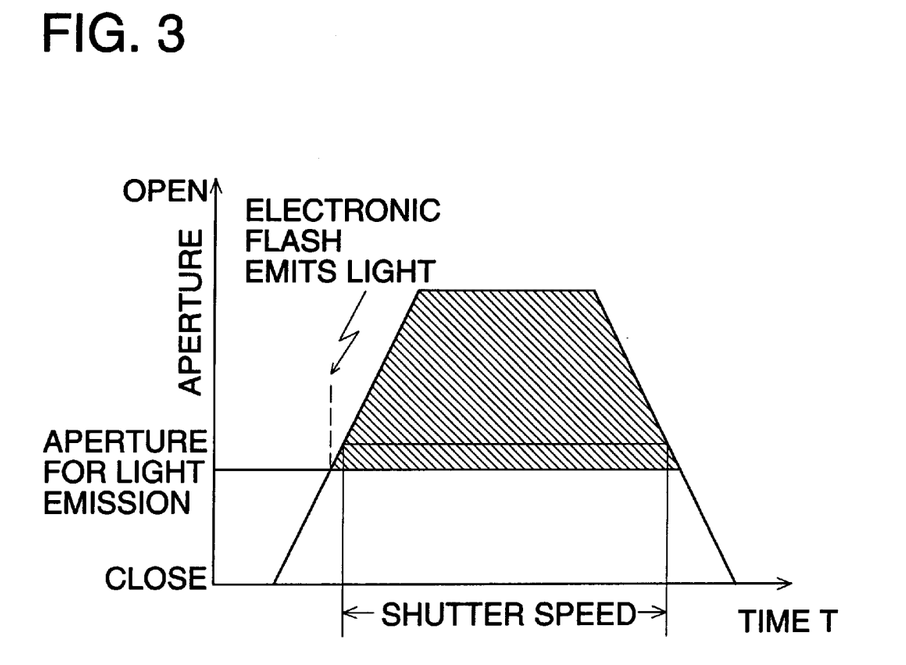
FIG. 3 is an illustration showing how a (CCD aperture is controlled in emission of an electronic flash in a silver halide camera equipped with an electronic viewfinder in an embodiment of the invention.

The foregoing is shown in FIG. 3. What is shown in FIG. 3 is a new method wherein an electronic flash is caused to emit light to give exposure simultaneously to a silver halide film and a solid image pick-up element in the single light emission at the moment when an aperture value of CCD aperture 212 becomes the aperture value for light emission in the period for the aperture value to change, so that exposure for a prescribed period of time may be made under the state that the aperture is greater than the aperture value for light emission.

Due to this new method, extra exposure is given to the background in the area (hatched portion) in FIG. 3 where CCD aperture 212 is further opened after light emission of an electronic flash, and it is possible to prevent that the background is extremely under exposure.

Though an electronic flash is caused to emit light when CCD aperture 212 is opening in FIG. 3, it is also possible to control so that an electronic flash is caused to emit light when CCD aperture 212 is closing.

In the case of control to change an aperture value of the CCD aperture 212 as stated above, the control wherein aperture-for-film/shutter 322 is made to be constant and the control wherein the aperture-for-film/shutter 322 is changed are considered. In either case, however, the effect stated above is not lost.

To synchronize with the aperture value determined by CPU 100 at the same timing in the case of the control to change both apertures, operations can be shifted relatively by staggering the timing to start operations of the aperture on at least one side.

Figure 4:
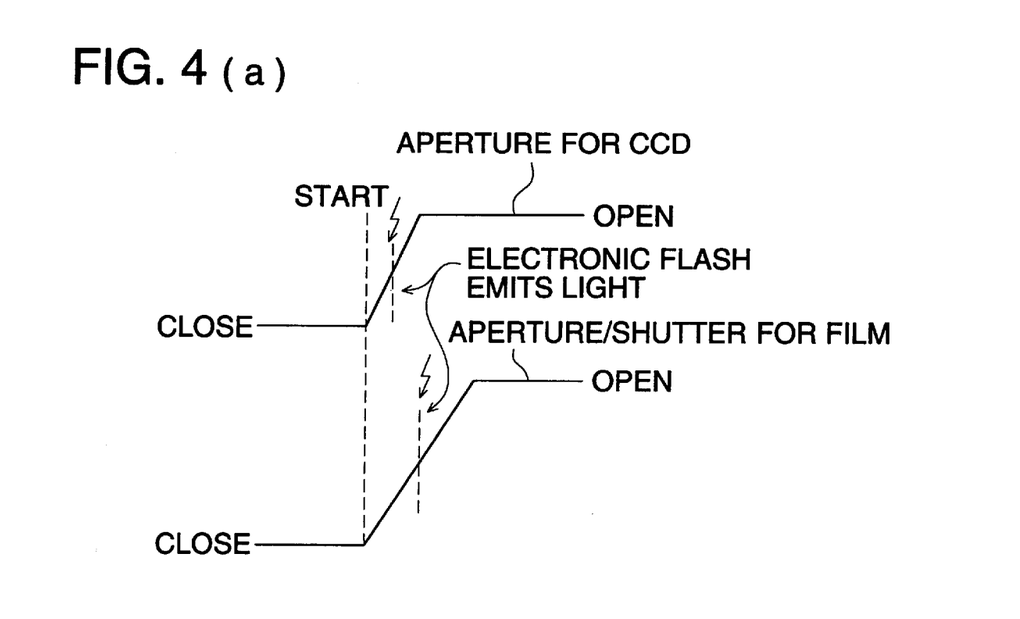

The foregoing is shown in each of FIGS. 4(*a*) and 4(*b*). FIG. 4(*a*) shows an occasion for both apertures to start operations simultaneously, which shows illustratively that a moment to arrive at the aperture value determined by CPU 100 (electronic flash light emission timing) does not agree with each other. In such a case, the timing to start operations of an aperture on at least one side is staggered as shown in FIG. 4(*b*) for relative shifting between apertures so that a moment to arrive at the aperture value determined by CPU 100 (electronic flash light emission timing) may agree with each other. It is preferable that electronic flash light emission timing is caused to agree with each other by the processing stated above, because the aperture value determined by CPU 100 is changed if the sensitivity of a film varies.

Even when silver halide film 323 and CCD 213 are different each other in terms of sensitivity, it is easy to cause silver halide film 323 and CCD 213 to be exposed simultaneously under the single light emission of an electronic flash, by just changing the aperture value on the part of a silver halide film in accordance With an amount of emitted light in light emission of an electronic flash and by controlling light emission timing in accordance with the timing of aperture change on the part of CCD.

It is also possible to cause a silver halide film to be subjected to prescribed exposure under the state where the aperture value has been changed from the constant aperture value for light emission (the state of further opening) after conducting light emission of an electronic flash under the state where aperture-for-film/shutter 322 is made to be constant. Due to this method, extra exposure can be given to a background at the portion where an aperture value is changed, and thereby, it is possible to prevent that a background is extremely on under exposure.

As a result, it is possible to give appropriate exposure to both of a silver halide film and CCD when an electronic flash emits light, because an electronic flash is caused to emit light while both of CCD aperture 212 and aperture-for-film/ shutter 322 are changed.

Namely, even when light emission of an electronic flash is conducted so that appropriate exposure may be given to a primary subject on CCD whose dynamic range is narrow, it does not happen that the background at which an electronic flash light does not arrive is too dark, thus description close to that of a silver halide film having a broad latitude is possible.

Incidentally, by using an electronic flash of a flashmatic control type in place of an automatic electronic flash, it is not necessary to adjust a quantity of light, thereby an electronic flash control circuit can be structured simply, which makes it to be low in cost and small in size. Further, by using an electronic flash of a flashmatic control type in place of an automatic electronic flash, exposure is stabilized, and appropriate exposure can be given to each of a silver halide film and a solid image pick-up element.

Figure 5:
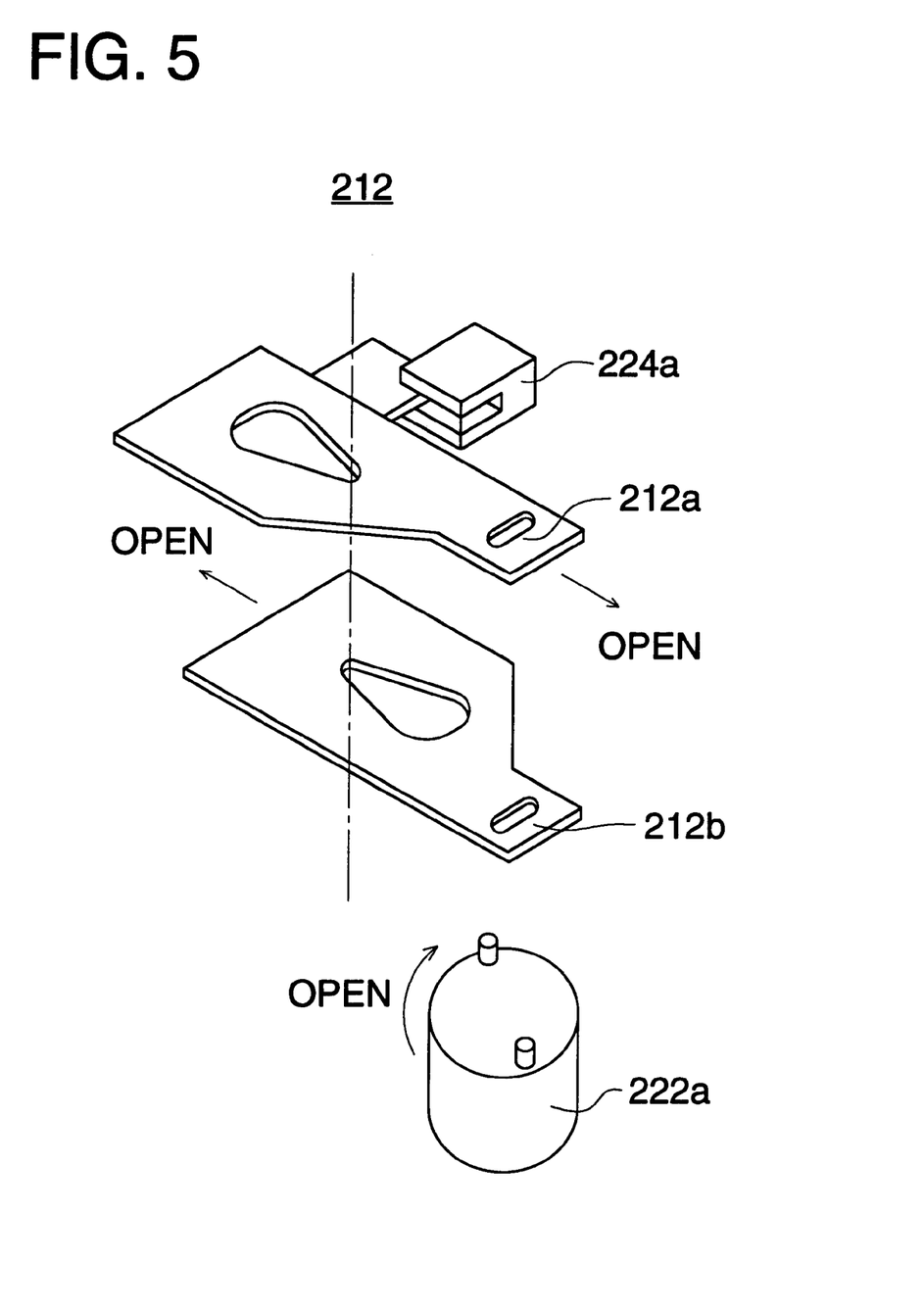
FIG. 5 is a structure diagram showing the schematic structure of a CCD aperture in a silver halide camera equipped with an electronic viewfinder in an embodiment of the invention.

FIG. 5 is an illustration showing an example of the structure of CCD aperture 212. In this case, CCD aperture 212 is composed of two holed plates including aperture plate 212*a* and aperture plate 212*b* which are structured to be driven by rotation of aperture driving source 222*a* which is composed of a motor.

The condition shown in FIG. 5 is for setting to form a minimum aperture, in which holes of two aperture plates are overlapped to form a smallest area. When aperture driving source 222a rotates in the arrowed direction, two aperture plates are also driven respectively in the arrowed directions to increase an overlapped area of two holes. Then, when the aperture becomes the maximum aperture, an aperture position detecting signal is outputted by aperture position detecting photointerrupter 224a. This aperture position detecting signal is transmitted to CPU 100 through aperture position detecting circuit 224.

Figure 6A:
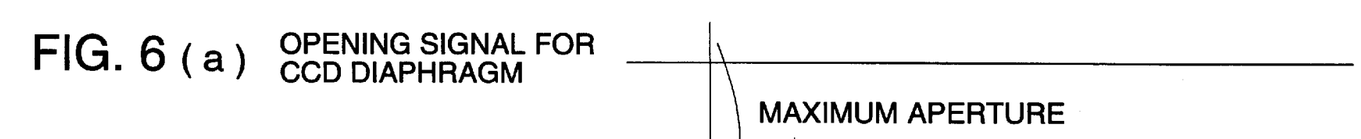
Figure 6B:
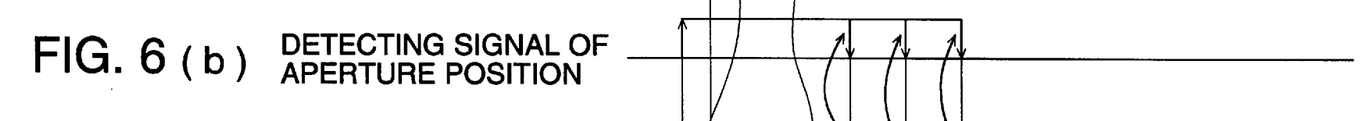

With regard to CCD aperture 212, the time required to arrive at the maximum aperture from the minimum aperture sometimes varies delicately due to a difference between products and various unexpected changes. Namely, as shown in FIGS. 6(a), 6(b) and 6(c), CCD diagram 212, is set to its minimum aperture at the time t0 (FIG. 6(b):t0), and CCD aperture full open signal is outputted from CPU 100 at the time t1 (FIG. 6(a):t1) to drive from the minimum aperture to the full open (maximum aperture).

Figure 6C:
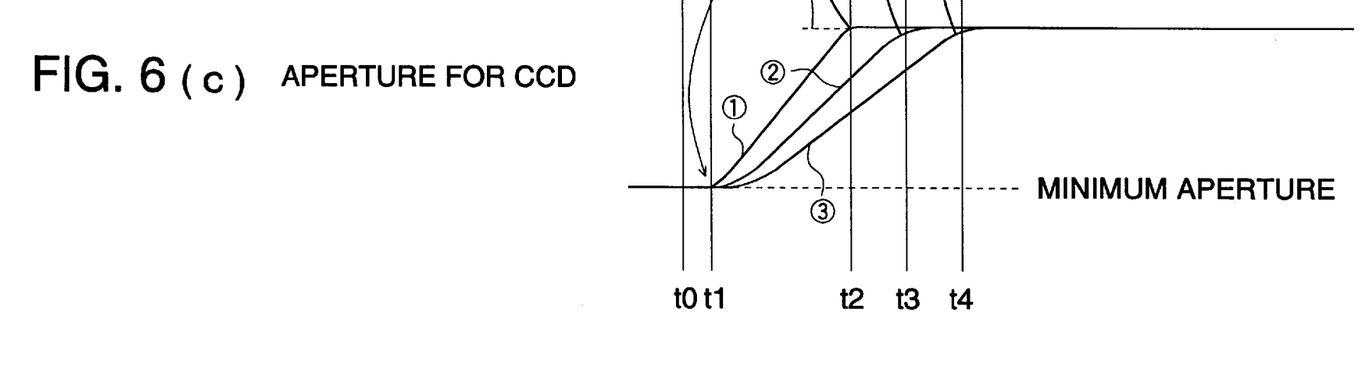

In this case, due to the difference between the products, there are some cases where the time required to arrive at the maximum aperture varies as shown with (1), (2) and (3) in FIG. 6(c). It is therefore anticipated to be difficult to determine the timing for light emission of an electronic flash stated above.

In the silver halide camera equipped with an electronic viewfinder in the present embodiment, therefore, let it be assumed that calibration processing for a CCD aperture stated below is conducted when the power supply is turned on.

Figure 7:
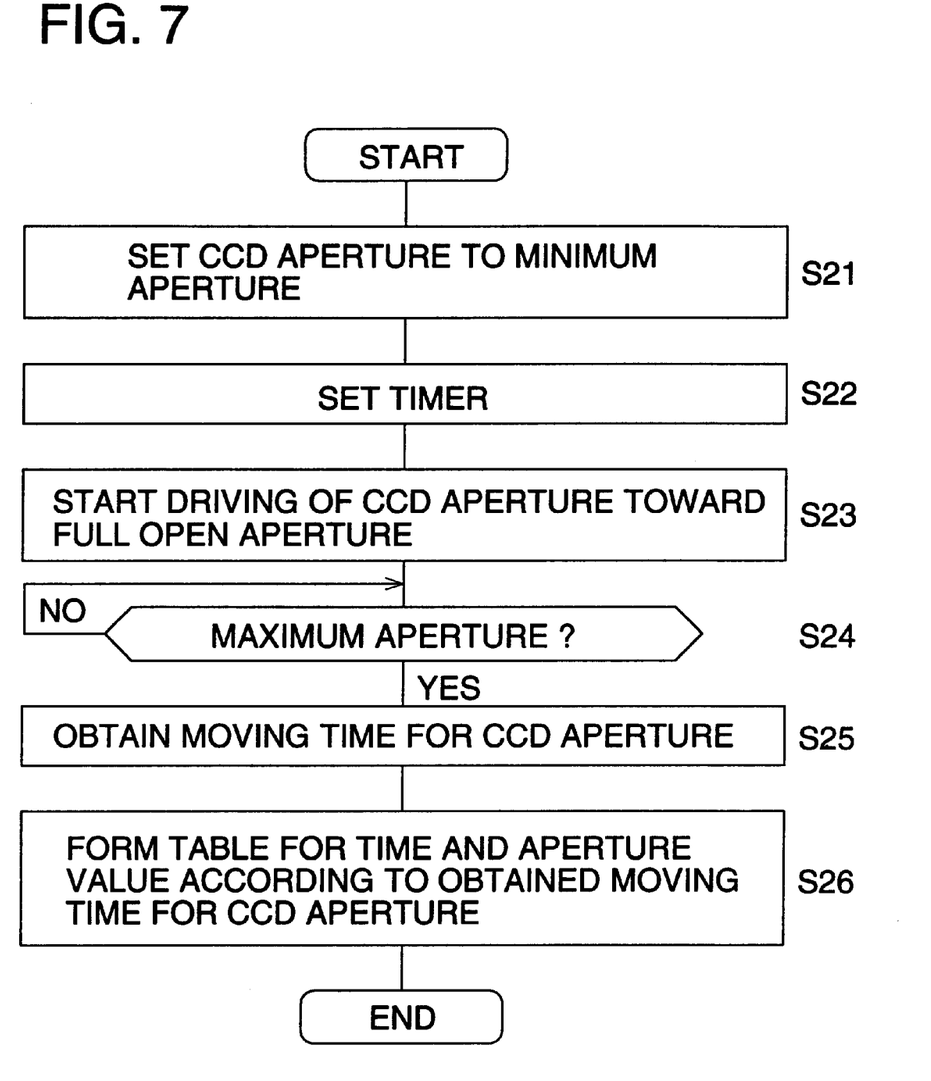
FIG. 7 is a flow chart showing an outline of processing for calibration processing for a CCD aperture in a silver halide camera equipped with an electronic viewfinder in an embodiment of the invention.

FIG. 7 is a flow chart showing an outline of processing for calibration processing for a CCD aperture conducted by CPU 100 when the power supply is turned on.

First, the CPU 100 detected the power supply turned on sets CCD aperture 212 to the minimum aperture after initialization of each part (S21), and then sets a timer for time measurement (S22).

Then, aperture driving circuit 222 drives the CCD aperture 212 toward full open (S23). Then, at the time when the CCD aperture 212 is confirmed to be the maximum aperture from the results of detection made by aperture position detecting circuit 224 (aperture position detecting photointerrupter 224a) (S24), CCD aperture moving time (minimum aperture→maximum aperture) is acquired from the timer for time measurement mentioned above (S25).

Then, a table of the time from the start driving toward CCD aperture full open and an aperture value is prepared by the use of the CCD aperture moving time (S26). Incidentally, when a table is prepared in advance in the case of adjustment in manufacturing, the table can be stored in a storage means to be used. It is also possible to make further correction or calibration on the table prepared in manufacturing.

This table is to be stored in a prescribed storage means inside or outside CPU 100, and is to be read by the CPU 100 when the timing for light emission of an electronic flash stated above is determined.

In the silver halide camera equipped with an electronic viewfinder, as stated above, an aperture value of CCD aperture 212 which makes the exposure on the electronic viewfinder to be appropriate is obtained from both a distance to a subject and a capacity of an electronic flash, then the relation between the aperture operation time obtained separately by CPU 100 representing a calculating means through calibration processing and the aperture value is referred to, and the electronic flash is controlled so that it may emit light at the timing when the aperture value of CCD aperture 212 becomes an appropriate value while the aperture value keeps changing.

Accordingly, when making the photographing on a silver halide film stated above and the image pick-up on CCD to be compatible by referring to the relation between the aperture operation time obtained by CPU 100 and the aperture value, it is possible to control accurately to the appropriate exposure on the part of the CCD.

Even when there are caused later the changes unexpected in manufacturing such as change with time, change with temperature and change with humidity, there is caused no gap between the appropriate aperture value and the actual aperture value for light emission, and exposure is stabilized, because the relation between the aperture operation time and the aperture value is obtained before the use (when the power supply is turned on) through calibration processing wherein CPU 100 causes CCD aperture 212 to operate. Therefore, even for the CCD having smaller light-receiving area than in a silver halide film, it is possible to obtain appropriate exposure without providing accurate aperture mechanism.

As a result, a difference of an amount of received light between a subject and a background on CCD is made small, which makes it possible to give appropriate exposure to both of a silver halide film and CCD in the case of light emission of an electronic flash.

Figure 8A:
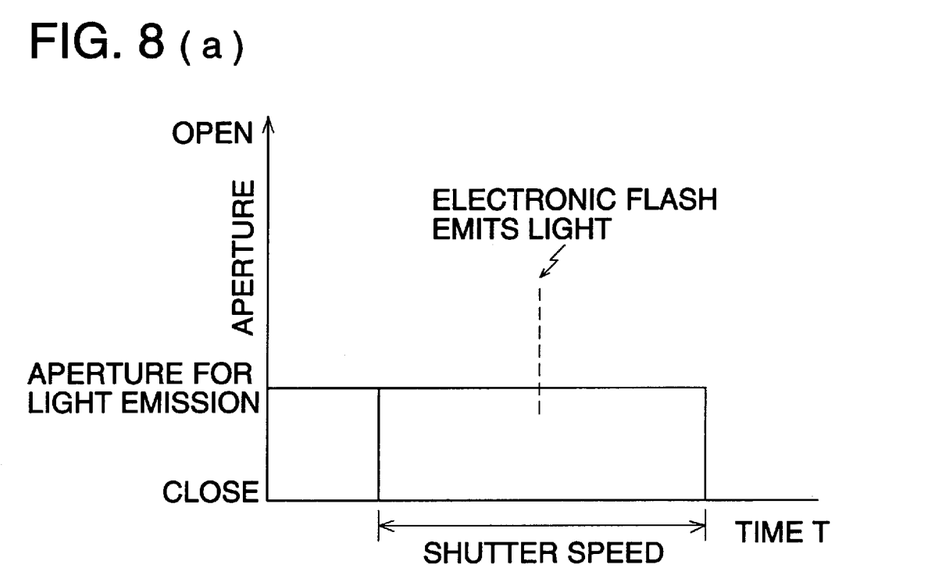
Figure 8B:
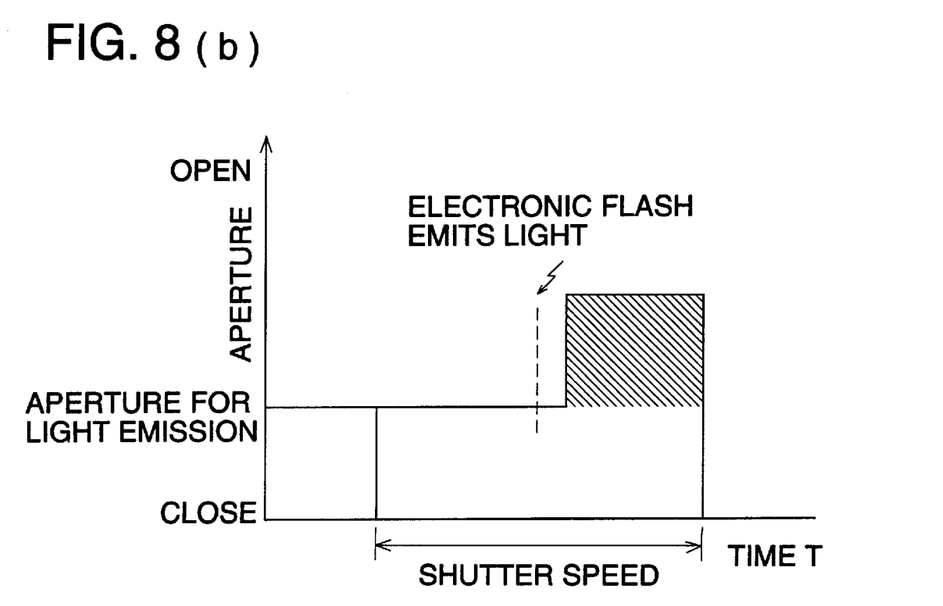

Each of FIGS. 8(a) and 8(b) is an illustration showing how CCD aperture 212 is controlled in light emission of an electronic flash. Incidentally, though opening and closing of an aperture is shown to be almost vertical as if the aperture is opened or closed instantly for easy comparison of the shutter speed in each of FIGS. 8(a) and 8(b), a certain period of time is actually required for the aperture to be opened and closed.

FIG. 8(a) shows a method wherein an aperture value for light emission is kept constant in CCD aperture 212 for the period of exposure of the flashmatic control type mentioned above. Due to this, there is produced an effect that the CCD aperture 212 and the timing for light emission of an electronic flash can be controlled simply.

In the case of the control shown in FIG. 8(a) wherein CCD aperture 212 is kept constant, there are considered two controls, one is to keep also aperture-for-film/shutter 322 to be constant, and the other is to keep the aperture-for-film/shutter 322 to be in operations. For both cases stated above, the aforesaid effect that the CCD aperture 212 and the timing for light emission of an electronic flash can be controlled simply is not lost.

Further, it is also possible to conduct light emission of an electronic flash while keeping the CCD aperture 212 to be constant, and then to conduct prescribed exposure while keeping the aperture to be greater than the constant aperture value for light emission, which is shown in FIG. 8(b).

In accordance with this new method, extra exposure is given to the background at the portion (hatched portion) where the CCD aperture 212 is further opened after the light emission of an electronic flash in FIG. 8(b), thus, it is possible to prevent extreme underexposure on the background.

Incidentally, in this case, an aperture value can be changed after the light emission of an electronic flash, and the aperture can also be narrowed. To prevent underexposure, it is preferable to open the aperture further to conduct prescribed exposure.

Namely, it is possible to solve, without slowing down the shutter speed of CCD 213, the problems in the past that an aperture value is determined by a distance to a subject and a background existing behind the subject tends to be underexposure, and when the results of image pick-up by CCD are displayed on LCD 273 for an image, the background is extremely darker than that in the results of photographing on a silver halide film.

In addition to the methods shown in FIGS. 8(*a*) and 8(*b*), it is possible to cause an electronic flash to emit light to give exposure simultaneously to a silver halide film and a solid image pick-up element in single light emission when an aperture value of CCD aperture 212 becomes the aperture value for light emission while the aperture value of CCD aperture 212 is changing, as shown in FIG. 3, and thereby to cause exposure for a certain period of time to be conducted under the condition that the aperture is greater than the aperture for light emission.

According to this method, extra exposure is given to the background at the portion (hatched portion) where the CCD aperture 212 is further opened after the light emission of an electronic flash in FIG. 3, thus, it is possible to prevent extreme underexposure on the background.

Incidentally, in this case, an electronic flash can be caused to emit light while the aperture value is changing, and an electronic flash can also be caused to emit light when the aperture is closed. Namely, though an electronic flash is caused to emit light when CCD aperture 212 is opened in FIG. 3, it is also possible to control so that an electronic flash is caused to emit light when CCD aperture 212 is closed.

As stated above, an electronic flash is caused to emit light while an aperture value of CCD aperture 212 is changing, and exposure for a certain period of time is conducted under the condition that an aperture is changed from the appropriate aperture value. Therefore, an exposure period wherein the aperture is changed from that in light emission of an electronic flash exists in a period other than the period of light emission of an electronic flash. Accordingly, extra exposure can be given also to the background existing behind the primary subject, and a difference of an amount of exposure between the background and the subject which is in appropriate exposure due to light emission of an electronic flash can be made small.

As a result, a difference of an amount of light received between a subject and a background on CCD is made small, which makes it possible to give appropriate exposure to both of a silver halide film and CCD in the case of light emission of an electronic flash.

Though light emission of an electronic flash is of a flashmatic control type in the embodiment stated above, it is also possible to use an automatic electronic flash. In this case, CPU 100 can control an aperture which is suitable for light emission of the automatic electronic flash.

Namely, the CPU 100 obtains first prescribed quantity of light A1 with which appropriate exposure is obtained in sensitivity of CCD 213 and in an aperture value of CCD aperture 212 and second prescribed quantity of light A2 with which appropriate exposure is obtained in sensitivity of silver halide film 323 and in an aperture value of aperture-for-film/shutter 322, so that appropriate exposure may be obtained for photographing on a silver halide film and for image pick-up on CCD in single light emission of an electronic flash, and controls an aperture value on at least one side so that A1 and A2 may agree with each other.

Then, electronic flash control circuit 341 which has received a command for light emission from CPU 100 causes an electronic flash to emit light when both aperture values arrive at determined values. In this case, photometric circuit 351 representing a detecting means detects luminance of a subject, starting from the start of light emission of an electronic flash, and when it detects that the luminance arrives at a prescribed quantity of light, CPU 100 serving as a light emission control means and electronic flash control circuit 341 stop the light emission of an electronic flash immediately.

Further, after completion of the light emission of an electronic flash, both apertures are further changed to conduct image pick-up for a prescribed period of time. By doing this, extra exposure can be given to the background, and a false night view can be prevented.

(Digital still camera equipped with an electronic flash)

With regard to a digital still camera equipped with an electronic flash employing a technology of the invention, the greater part of the description concerning the silver halide camera equipped with an electronic viewfinder stated earlier except the description relating to the structure and operations for photographing on a silver halide film can be used as a description of the digital still camera. Therefore, the details are omitted here.

With regard to a digital camera equipped with an electronic flash, however, it does not have mechanism to photograph on a silver halide film, and when a release switch is pressed, CCD conducts image pick-up of still images, and image information stored in a memory through image pick-up are recorded on a recording medium. In that case, images in the course of image pick-up are displayed on an electronic viewfinder as still images.

In the case of conducting no image pick-up for still images, when images picked up by CCD on a real time basis are outputted on an electronic viewfinder as moving images, it is preferable that the aperture value of a variable aperture is fixed.

In the case of image pick-up with an electronic flash for still images, the aperture value of a variable aperture is changed to the obtained aperture value of flashmatic control, and that aperture value is used for image pick-up with an electronic flash.

In that case, it is preferable that electronic flash exposure is conducted after a variable aperture is fixed to the determined aperture value.

Further, in the digital camera equipped with an electronic flash, it is also possible to employ an automatic electronic flash control in addition to flashmatic control.

Incidentally, as a range-finding means of the invention, it is possible to use various means which are used for an automatic focusing technology of a camera. Examples thereof include a passive method to utilize contrast of a subject, an active method to project irradiation light to a subject and to utilize reflected light therefrom, and a method wherein an image is formed on a focal plane of a CCD sensor by subject light through a camera lens, and a degree of blurred image is subjected to range-finding.

As explained in detail in the embodiment and examples above, following effects can be obtained from the inventions described above.

(1) Owing to the image pick-up device (camera for conducting image pick-up by means of a solid image pick-up element) in the invention, it is possible to photograph with an appropriate amount of exposure when photographing with light emission of electronic flash mechanism.

(2) Owing to the image pick-up device (silver halide camera equipped with an electronic viewfinder) in the invention, it is possible to photograph with an appropriate amount of exposure by a silver halide film and a solid image pick-up element when photographing with light emission of electronic flash mechanism.

Further, the invention makes it possible to provide a digital still camera equipped with an electronic flash which can be made low in cost and small in size and which can stabilize exposure and can obtain appropriate exposure in photographing with an electronic flash. Disclosed embodiment can be varied by a skilled person without departing from the spirit and scope of the invention.

What is claimed is:

1. An image pick-up apparatus comprising:
   (a) a first image pick-up optical system having a first variable aperture capable of changing a first aperture value;
   (b) a first image pick-up device for picking up an object image incident through said first image pick-up optical system, and converting said object image to an electric image signal;
   (c) a second image pick-up optical system having a second variable aperture capable of changing a second aperture value, said second variable aperture serving also as a shutter;
   (d) a silver halide photographing component for photographing an object image incident on a silver halide film through said second image pick-up optical system, photographing on said silver halide film being started when said second variable aperture starts moving from its closed position toward its open position;
   (e) range finder for measuring a distance to an object;
   (f) an electronic flash mechanism for illuminating said object; and
   (g) a control for determining a first determined aperture value of said first variable aperture and a second determined aperture value of said second variable aperture based upon said distance and upon a light emission capability of said electronic flash mechanism, said control causing said first variable aperture to start operations so that said first aperture value reaches said first determined aperture at the same time as said second aperture value reaches said second determined aperture value, said control causing said flash mechanism to emit light when said first aperture value and said second aperture value reach said first determined aperture value and said second determined aperture value respectively after said image pick-up device starts picking up said object image and said silver halide photographing component starts photographing.

2. The image pick-up apparatus of claim 1 wherein, when said first variable aperture reaches said first determined aperture value during a period for said first aperture value to change, said control causes said electronic flash mechanism to emit light.

3. The image pick-up apparatus of claim 2 wherein said control causes said first variable aperture to fix at said first determined aperture value and, thereafter, said controller causes said electronic flash mechanism to emit light.

4. The image pick-up apparatus of claim 3 wherein said control, after causing said electronic flash mechanism to emit light, further changes said first aperture value to cause said image pick-up to pick up for a prescribed period of time.

5. The image pick-up apparatus of claim 1 comprising a storage element for storing a relation between an operation time for the first variable aperture to operate from the prescribed aperture value and an amount of change in the aperture value of the first variable aperture and, based on said relation, said control causes said electronic flash mechanism to emit light driving the first variable aperture so that the first determined aperture value is achieved.

6. The image pick-up apparatus of claim 1 comprising a display device for displaying a pick-up image based on said electric image signal.

7. The image pick-up apparatus of claim 1 wherein said control determines said first determined aperture value so that a signal level is emitted by said image pick-up device, and determines said second determined aperture value so that an exposure of said silver halide photographing film is appropriate for said film.

8. The image pick-up apparatus of claim 7 wherein said control causes said electronic flash mechanism to emit light when said second aperture value reaches said second determined aperture value while the aperture value of the second variable aperture is changed.

9. The image pick-up apparatus of claim 7 wherein after said control fixes the second variable aperture to the second determined aperture value, said control causes said electronic flash mechanism to emit light for a predetermined period of time, and changes said second determined aperture value after said predetermined period of time.

10. The image pick-up apparatus of claim 7 wherein said control causes said electronic flash mechanism to emit light after said second variable aperture reaches said second determined aperture value.

11. The image pick-up apparatus of claim 7 wherein said control causes said electronic flash mechanism to emit light after said first variable aperture reaches said first determined aperture value.

12. The image pick-up apparatus of claim 1 wherein at least one of a time at which said first aperture starts movement toward said first determined aperture value and a time at which said second aperture starts movement toward said second determined aperture value is shifted in accordance with a sensitivity of a film in said silver halide photographic component.

13. The image pick-up apparatus of claim 12 wherein at least one said time is shifted to control when said electronic flash mechanism emits light.

* * * * *